3,317,435
METHOD FOR FEEDING AN ANTI-FOAMING AGENT TO A REACTION VESSEL
Sunao Yamashita, Yutaka Iida, Yutaka Hara, Yutaka Hirukawa, and Iwao Kameyama, Tokyo, Japan, assignors to Ajinomoto Co., Inc., Tokyo, Japan
Filed May 20, 1964, Ser. No. 368,958
Claims priority, application, Japan, May 23, 1963, 38/25,621
1 Claim. (Cl. 252—321)

The present invention relates to a method for feeding an anti-foaming agent to a reaction vessel.

In many chemical reactions, such as neutralization and fermentation processes, the reaction is accompanied by considerable foaming. Since this interferes with the process, anti-foaming agents must be fed to the reaction vessel to dispose of the foam layer carried by the reaction liquor.

It has been proposed to install a foam breaking impeller in the reaction vessel above the liquid level to break the foam layed mechanically. However, when excessive foam is developed and the foam layer rises above the impeller, the latter tends to create more foam instead of breaking it up. Therefore, it is essential to keep the foam layer within a critical layer and not to permit it to rise above predetermined maximum. For this reason, it has been proposed to feed an anti-foaming agent to the reaction vessel to prevent excessive foam formation and to keep the foam layer within its critical limit.

It is the primary object of the present invention to provide an accurate and automatic control for the anti-foaming agent supply to the reaction vessel, in direct response to the foaming conditions in the vessel.

It is a more specific object of this invention to derive a variable electrical control signal from the mechanical foam breaking power expended by a foam breaking impeller as it encounters increased mechanical resistance from an increasing amount of foam in a reaction vessel, and to control the feeding of anti-foaming agent to the vessel in response to this signal.

In accordance with the invention, this may be accomplished with an apparatus wherein an electrical motor drives a foam breaking impeller in a reaction vessel and means is provided in the electric circuit which supplies current to the motor for detecting changes in the rate of current flow in the circuit as the load on the motor increases. An anti-foaming agent feed line is connected to the reaction vessel and a normally closed valve means is arranged in the feed line to cut off delivery of the agent from a supply to the vessel. An electrically-operated control means opens the valve means in response to a predetermined amperage increase being detected by the current flow detecting means in the electrical motor circuit.

The above and other objects and features of the invention will become more apparent in connection with the following detailed description of certain preferred embodiments, taken in conjunction with the accompanying drawing wherein.

Figure 1:
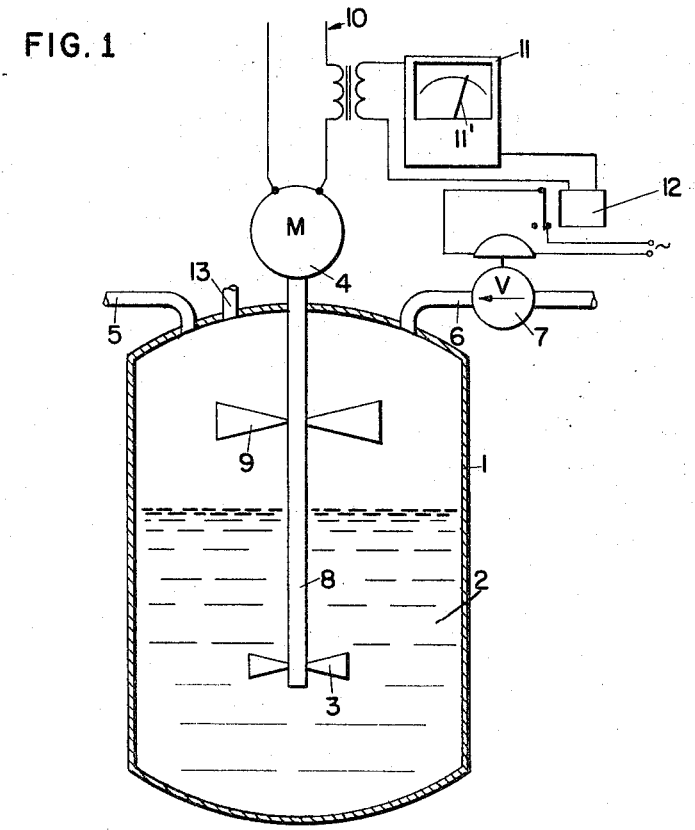
FIG. 1 is a schematic side view of one embodiment of this invention.
Figure 3:
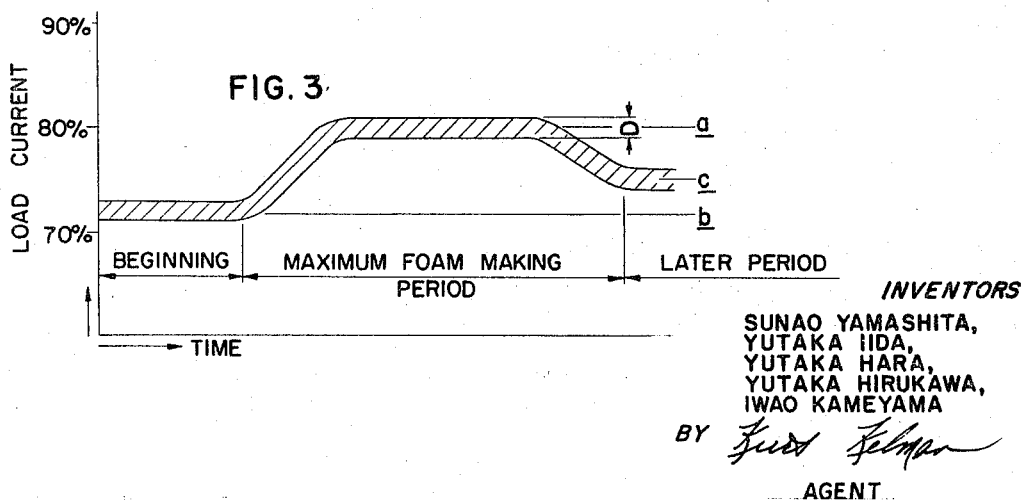

FIG. 3 graphically illustrates the criteria for proportioning the sizes of the two impellers in the embodiment of FIG. 1.

Figure 2:
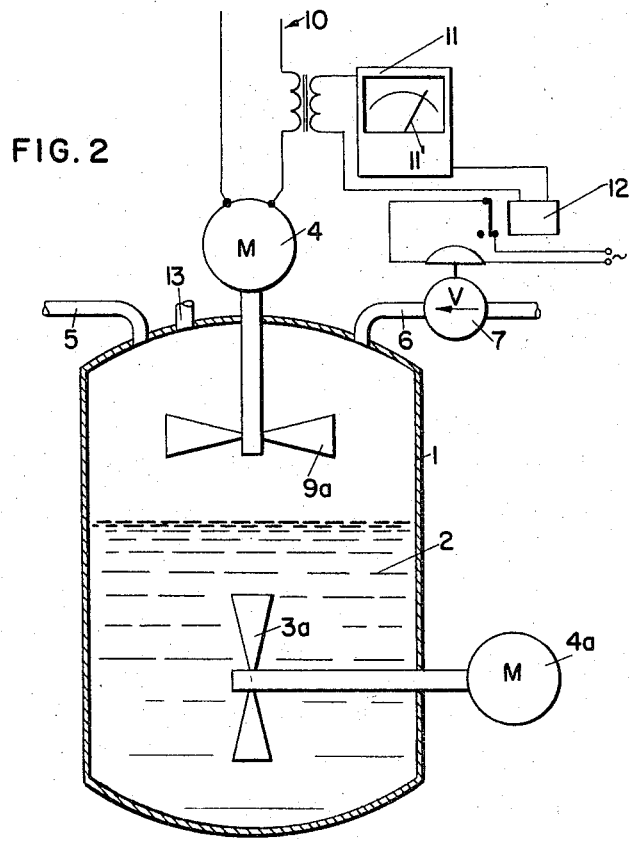
FIG. 2 is a like view of another embodiment.

The present invention has been illustrated and will be described merely by way of example in connection with a process of neutralizing a highly alkaline liquid. Since the embodiments of FIGS. 1 and 2 differ merely by the fact that FIG. 1 shows an apparatus wherein both impellers are driven by a single motor while the two impellers of FIG. 2 are independently mounted and driven, the same reference numerals have been used in both figures for the same parts, the description of these parts in connection with FIG. 1 covering the like portions of FIG. 2.

Referring now to the drawing, there is shown a reaction vessel 1 which is a tank wherein a solution 2 having a high pH is neutralized by feeding an acid to the tank through inlet conduit 13. While the acid is gradually added, the liquid 2 is stirred by stirring impeller 3 driven by electrical motor 4. As the reaction proceeds and the pH of liquid 2 is lowered, the rate of foaming increases rapidly and may become so violent that foam as well as liquid may escape from the tank through exhaust conduit 5.

To avoid or at least to reduce this to a minimum, any suitable anto-foaming agent is fed to tank 1 through feed line 6 connected thereto. The feed line delivers the anti-foaming agent from a supply (not shown) to the tank when the normally closed valve 7 is opened, the valve being arranged in line 6 between the anti-foaming agent supply and tank 1.

In accordance with one embodiment of the invention, the impeller shaft 8 carries not only stirring impeller 3 but also a foam breaking impeller 9 above the normal level of the reaction liquor. Thus, the same electrical motor 4 drives both impellers in parallel planes, impeller 3 stirring the liquid reactants while impeller 9 mechanically breaks any foam layer carried by the liquid. The current flow in the electrical circuit 10 supplying current to the motor will vary, of course, with any changes in the density and/or viscosity of the liquid as well as with the conditions of the foam carried by the liquid. In other words, the current flow is a function of the load, i.e. the total resistance encountered by the two impellers as they are driven by the motor through the liquid and the foam, if any of the latter is present.

Since the present invention is concerned only with making the anti-foaming agent feed a direct function of the foam condition and it is, therefore, necessary accurately to detect only such current flow variations in the motor supply circuit, which are due solely to the foam condition and independently of the liquid condition, we have found that the impeller sizes must be properly proportioned in accordance with the following considerations, reference being had to the graph of FIG. 3.

In this graph, the reaction time is indicated on the abscissa while the percentage of the total current flow of the drive motor is shown on the ordinate. At the beginning of the reaction, there is no foam development and the current flow $b$ is about 70% of capacity, only impeller 3 encountering resistance as it stirs the liquid reactants. Early foam formation is mechanically broken up and the foam disappears but as the reaction proceeds to the maximum foaming period and foam breaking impeller 9 encounters the increasing resistance of the developing foam, the current flow $a$ increases to about 80% of capacity. This value varies with the size of the impeller.

At the end of the reaction, there is no longer any foam formation but, since the liquid is denser, the load and the corresponding current flow $c$ is a little higher than at the beginning, at $a$.

D is the normal fluctuation of the current flow, amounting to about 3% of the total capacity.

The value $a-b$ designates the change in the motor current flow, due to the impeller resistance encountered by the foam as well as changes in the liquid conditions, as the reaction proceeds.

The value $c-b$ designates the motor current flow change due solely to changes in the liquid conditions from the beginning to the end of the reaction.

If the two above values were almost the same, it would be impossible to differentiate between changed foam and liquid conditions during the reaction. Therefore, the foam conditions could not be used as a selective control and an accurate, automatic feeding of anti-foaming agent in response to the foam condition would not be possible.

In view of the above, it is necessary that the value $a-b$ differ significantly and measurably from the value $c-b$ so that the former may produce an electric control signal not produced by the latter. This may be readily achieved and the value $a-b$ may be made significantly and measurably larger than the value $c-b$ by properly proportioning the sizes of the two impellers, the resistance encountered by the impellers during rotation in the same medium being a direct function of their size and the driving motor current rate being a direct function of this resistance, i.e. the motor load.

While the relative sizes of the impellers will differ, depending on the reactants, and the proper sizes may be readily determined experimentally with the above criteria in mind, we have found it useful for the value $a-b$ to be about 10% of the total current flow so that the size of the stirring impeller is such that it uses about 90% of the total current and the foam breaking impeller uses about 10% of the total current during the reaction period when foam is produced. As indicated, this 9:1 ratio will change with different reactants.

A current flow metering device or ammeter 11 is arranged in the motor current supply circuit 10 in series and its index 11′ indicates the current flow rate in the circuit. This device is so set that, when the current flow increases by a predetermined value $a-b$, the index will close a circuit to relay 12, thus actuating the relay and opening valve 7 operated by relay 12. While sufficient foam remains in the tank 1 to raise the resistance encountered by impelller 9 sufficiently to produce the preset current flow conditions, the valve will thus remain open and anti-foaming agent will be fed into tank 1.

In this manner, the anti-foaming agent delivery is most accurately controlled in direct response to the foam condition, to increase the feeding rate when the foam layer increases and to decrease the feeding rate when the foam layer decreases, thus limiting the amount of this agent to the necessary minimum, producing corresponding economies and preventing the introduction of undue amounts of impurities into the reaction vessel.

The apparatus of FIG. 2 is substantially similar to that of FIG. 1 and operates in the same manner, except that the foam breaking impeller 9a is mounted and driven independently from stirring impeller 3a whose driving motor is shown at 4a.

In this embodiment, of course, impeller 9a will respond solely to the foam condition so that a predetermined current flow value may be set in ammeter 11 to operate the valve actuating relay 12. Thus, there is no need for coordinating the sizes of the impellers in this embodiment, the stirring impeller 3a, which is subject to the liquid conditions, operating independently of impeller 9a and not influencing the load of motor 4.

The following example is further illustrative of the method of the invention, but it will be understood that the invention is not limited thereto.

*Example*

Glutamic acid was produced by fermentation in a known manner in the apparatus shown in FIG. 1, and on an industrial scale.

The foam breaking impeller is a rotary paddle having a diameter of 3 meters. When the impeller is driven by a 75 H.P. motor, the rate of current flowing to the motor is 9.5 amperes. (This power is mostly expended for stirring the solution.) On the other hand, during the foaming period, silicon oil as an anti-foaming agent is fed to the vessel 1 for keeping the rate of current flow at 11 amperes to avoid overloading the motor.

As a result, 6 k.g. of silicon oil is found sufficient instead of 30 k.g. which would be required by the usual method, yet the yield of the glutamic acid was almost equal to that produced by the usual method.

We claim:

In a method of feeding an anti-foaming agent to a reaction vessel containing a liquid carrying a top layer of foam: the steps of mechanically breaking the foam layer, deriving a variable electrical signal from the mechanical power required for breaking the foam layer, the signal varying with said power as the foam layer increases and decreases, and controlling the feeding of the anti-foaming agent in response to said signal to increase the feeding rate when said layer increases and to decrease said feeding rate when said layer decreases.

References Cited by the Examiner

UNITED STATES PATENTS

| 908,951 | 1/1909 | Carmichael | 252—321 X |
| 2,626,786 | 1/1953 | McGlothlin | 137—92 X |

MORRIS O. WOLK, *Primary Examiner.*

J. H. TAYMAN, JR., *Examiner.*